United States Patent
Edamura et al.

(10) Patent No.: US 8,477,378 B2
(45) Date of Patent: Jul. 2, 2013

(54) IMAGE PROCESSING APPARATUS AND IMAGE PROCESSING METHOD

(75) Inventors: Tetsuya Edamura, Kawasaki (JP); Kiichiro Takahashi, Yokohama (JP); Minoru Teshigawara, Saitama (JP); Akiko Maru, Tokyo (JP); Takatoshi Nakano, Tokyo (JP); Hiroshi Taira, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 769 days.

(21) Appl. No.: 12/704,929

(22) Filed: Feb. 12, 2010

(65) Prior Publication Data

US 2010/0214617 A1    Aug. 26, 2010

(30) Foreign Application Priority Data

Feb. 20, 2009    (JP) ................................. 2009-038523

(51) Int. Cl.
*G06K 15/00*    (2006.01)

(52) U.S. Cl.
USPC .......... 358/3.03; 358/3.12; 358/1.9; 358/466; 382/162

(58) Field of Classification Search
USPC ..................................................... 358/3.03
See application file for complete search history.

(56) References Cited

U.S. PATENT DOCUMENTS

| 6,987,567 B2 | 1/2006 | Takahashi et al. |
| 7,163,270 B2 | 1/2007 | Hoshii |
| 7,403,732 B2 | 7/2008 | Shimazu et al. |
| 7,433,102 B2 | 10/2008 | Takahashi et al. |
| 7,443,536 B2 | 10/2008 | Takahashi |
| 7,616,361 B2 | 11/2009 | Takahashi |
| 7,667,845 B2 | 2/2010 | Takahashi et al. |
| 2005/0018222 A1 | 1/2005 | Yoshida |
| 2006/0066887 A1 | 3/2006 | Saida et al. |

FOREIGN PATENT DOCUMENTS

| JP | 2001-157055 A | 6/2001 |
| JP | 2003-224730 | 8/2003 |
| JP | 2004-265297 A | 9/2004 |
| JP | 2004-358690 A | 12/2004 |
| JP | 2005-125508 A | 5/2005 |
| JP | 2006-268331 A | 10/2006 |
| JP | 2007-110468 A | 4/2007 |

*Primary Examiner* — Twyler Haskins
*Assistant Examiner* — Michael Burleson
(74) *Attorney, Agent, or Firm* — Fitzpatrick, Cella, Harper & Scinto

(57) ABSTRACT

A region for quantization having a value lower than the value B is assumed as having little influence by Bk data on the pixels in this region. Thus, in order to prioritize the optimization of the granularity at the start of the input of GY data, the LUT having a combination of GY and gy as an input as an input is used to perform separation quantization. On the other hand, since a region having a value equal to or higher than the value B requires the use of Bk data, the LUT having only a combination of Bk and GY as an input as an input is used to perform quantization. As a result, the number of types of pieces of ink data referencing the table can be 2, thus suppressing an increase in the table size.

10 Claims, 15 Drawing Sheets

IMAGE PROCESSING APPARATUS AND IMAGE PROCESSING METHOD

BACKGROUND OF THE INVENTION

1. Field of the Invention

The present invention relates to an image processing apparatus and an image processing method. In particular, the present invention relates to a quantization processing that determines quantized values of a plurality of colors at the respective grid points in a table so that the quantized values are associated with each other, in a configuration where pieces of multi-valued data for a plurality of colors are quantized by using the table to which these pieces of multi-valued data are input.

2. Description of the Related Art

An error diffusion method has been known as a quantization for converting multi-valued data to binary data. This error diffusion method has advantage of providing high quality image. In recent years, in order to provide a more various gradation reproduction, an approach has been made to set quantized data to be three-valued or more data instead of the binary. In this case, a plurality of threshold value is set so that three-valued or more quantized data is obtained.

According to Japanese Patent Laid-Open No. 2003-224730, a method is disclosed in which, in a case of obtaining three-valued or more quantized data by quantizing respective multi-valued data for a plurality of colors such as cyan, magenta, and yellow, a lookup table is used to associate the quantization of respective the multi-valued data for the plurality of colors by error diffusion with one another. In particular, this method sets quantized values of the respective plurality of colors at the respective grid points of a table to use the table and thereby obtain quantized values corresponding to the multi-valued data of the respective colors. In the table, these quantized values have been corrected based on density regions of the respective perceived densities defined in the table. According to this method, a favorable visual characteristic can be obtained in an image printed by superposing a plurality of colors on one another.

In a printing apparatus such as a color inkjet printer, it is known that four basic types of cyan ink (C), magenta ink (M), yellow ink (Y), and black ink (K) are used to perform printing. Another printing is also known that uses, in addition to the above four colors, ink having a relatively-low color material concentration (light ink) such as dye and pigment is used to print an image of a further high quality, for example, an image in which a reduced granularity in a highlight part and a high density in a shadow part are both achieved. An apparatus also has been known in which sizes of ejected ink droplets are differentiated for the same color to print dots of a plurality of sizes so that a high-quality image can be printed similarly. Specifically, the above two types of apparatuses form images so that the highlight part (a low density region of a print density) is printed with dots having a relatively-low optical density (light ink dot or small dot) and a shadow part (a high density region of a print density) is printed with dots having a relatively-high optical density (dark ink dot or large dot).

A high image quality equal to that of silver halide photography is required not only in a color image but also in a monochrome image and in particular a gradation is important in a monochrome image. In the case of a configuration for forming a monochrome image by mixing C, M, and Y inks, slight variations of the respective C, M, and Y inks, for example, variation in relative landing positions of the inks and variation in ink droplet sizes, causes a disadvantage that color change in an image deteriorates quality of the image. In the case of a configuration where an image is formed by black ink only, no variation may be caused in the above-described relative landing positions and in the ink droplet sizes. Thus, this configuration is free from a deteriorated image quality such as the color change. From the viewpoint as described above, a printing apparatus has been proposed in which whether an image to be printed is a color image or a monochrome image is determined and a different ink type is used depending on the determination result. Specifically, in a case of printing a color image, C, M, and Y inks are mainly used and in a case of printing a monochrome image, Kink is mainly used. Furthermore, in a case of printing the monochrome image, similarly to the above-described color printing, dots having a relatively-low optical density and dots having a relatively-high optical density are used as the print region demands to achieve both of reduced granularity in a highlight part and a high density in a shadow part, thereby providing the printing of an image having a photograph quality. As one configuration realizing this, an apparatus has been known that uses black ink having a high color material concentration (black ink: K ink) and black ink having a low color material concentration (gray ink: GY ink).

FIG. 1 illustrates how to use K ink and GY ink in the printing of a monochrome image. In a highlight part near the lowest density level shown by input data (region I shown in FIG. 1), only GY ink is used to perform printing. As the input level increases from this region, the ejection amount of GY ink (output level of density) increases (region II). Thereafter, when the input level exceeds a predetermined value, the use of K ink is started and a relatively-high ejection amount of GY ink is maintained (region III). This can consequently arrange K dots in a scattered manner while maintaining the high GY density. A region where the level is almost maximum (region IV) mainly uses K ink only.

However, when the gradation expression is performed as shown in FIG. 1 where dark and light dots respectively formed of dark and light inks (K ink and GY ink) are used, the granularity by the dark dots may be conspicuous in the region III (middle gradation region). This disadvantageous granularity in the middle gradation region is solved if the difference in the concentration between dark and light inks is reduced. However, this reduction of the concentration difference in turn makes it difficult to achieve both of low granularity in a highlight part and a sufficient high density in a shadow part.

To solve the above problem, a configuration may be considered as shown in FIG. 2 in which dark, medium, and light dots are used or four levels or more of dark and light dots are used. This configuration improves the above-described problem due to the use of the two types of dark and light dots (granularity and density). However, in the region III (where the input of large GY dots is started as medium dots) and the region V (where the input of large BK dots is started as dark dots) in FIG. 2, the granularity by the start of the input of medium dots and dark dots may be conspicuous.

On the other hand, the above described Japanese Patent Laid-Open No. 2003-229730 discloses a technique in which a separation quantization table (CM separation table) is used in order to suppress the superposition of dots of different colors for reducing the granularity. If this technique is used for dark, medium, and light inks, dark, medium, and light dots can be prevented from being superposed on one another as much as possible.

However, in the case of the technique disclosed in Japanese Patent Laid-Open No. 2003-224730, with increase of the types of inks used in an apparatus causing a proportional increase of the types of multi-valued data to be quantized, the table size increases exponentially based on the number of types of the multi-valued data. Specifically, if the technique disclosed in Japanese Patent Laid-Open No. 2003-224730 is applied to a system using three types or four or more types of dark and light inks, a disadvantage of an enormous table size is caused.

It should be noted that the above described problem may be caused not only in a case of using the dark and light inks but also in a case of differentiating sizes of dot formed with same color of ink (that is, in a case of using large and small dots).

SUMMARY OF THE INVENTION

An objective of the present invention is to provide an image processing apparatus and an image processing method in which the granularity in a middle gradation region in particular can be reduced by the quantization using a table without causing an increase in the table size.

In a first aspect of the present invention, there is provided an image processing apparatus that generates quantized data used for forming three or more types of dots having same hue which are different from one another in optical densities, the apparatus comprising: a generation unit configured to generate a plurality of multi-valued data for forming the three or more types of dots, based on data representing one color component; and a quantization unit configured to subject two multi-valued data corresponding to the two types of dots which are determined depending on a value of the color component data among the plurality of multi-valued data, to quantization with use of a table for generating quantized data, and to subject remaining multi-valued data other than the two multi-valued data to quantization without use of the table for generating quantized data, wherein the table is configured so that the two multi-valued data and quantized data corresponding to the tow multi-valued data are associated with one another.

In a second aspect of the present invention, there is provided an image processing apparatus that generates quantized data used for forming three or more types of dots having same hue which are different from one another in optical densities, the apparatus comprising: a generation unit configured to generate a plurality of multi-valued data for forming the three or more types of dots, based on data representing one color component; and a quantization unit configured to subject two multi-valued data corresponding to the two types of dots which are determined depending on a value of the color component data among the plurality of multi-valued data, to quantization with the two multi-valued data being associated with one another, and to subject remaining multi-valued data other than the two multi-valued data to quantization individually.

In a third aspect of the present invention, there is provided an image processing method for generating quantized data used for forming three or more types of dots having same hue which are different from one another in optical densities, the method comprising: a generation step of generating a plurality of multi-valued data for forming the three or more types of dots, based on data representing one color component; and a quantization step of subjecting two multi-valued data corresponding to the two types of dots which are determined depending on a value of the color component data among the plurality of multi-valued data, to quantization with use of a table for generating quantized data, and of subjecting remaining multi-valued data other than the two multi-valued data to quantization without use of the table for generating quantized data, wherein the table is configured so that the two multi-valued data and quantized data corresponding to the tow multi-valued data are associated with one another.

In a fourth aspect of the present invention, there is provided an image processing method for generating quantized data used for forming three or more types of dots having same hue which are different from one another in optical densities, the method comprising: a generation step of generating a plurality of multi-valued data for forming the three or more types of dots, based on data representing one color component; and a quantization step of subjecting two multi-valued data corresponding to the two types of dots which are determined depending on a value of the color component data among the plurality of multi-valued data, to quantization with the two multi-valued data being associated with one another, and of subjecting remaining multi-valued data other than the two multi-valued data to quantization individually.

According to the configuration as described above, the number of multi-valued data for referencing a table used for quantization can be two at most, thus suppressing an increase in the table size.

Further features of the present invention will become apparent from the following description of exemplary embodiments (with reference to the attached drawings).

DESCRIPTION OF THE EMBODIMENTS

Embodiments of the present invention will be described with reference to the drawings.
(Embodiment 1)

Figure 3:
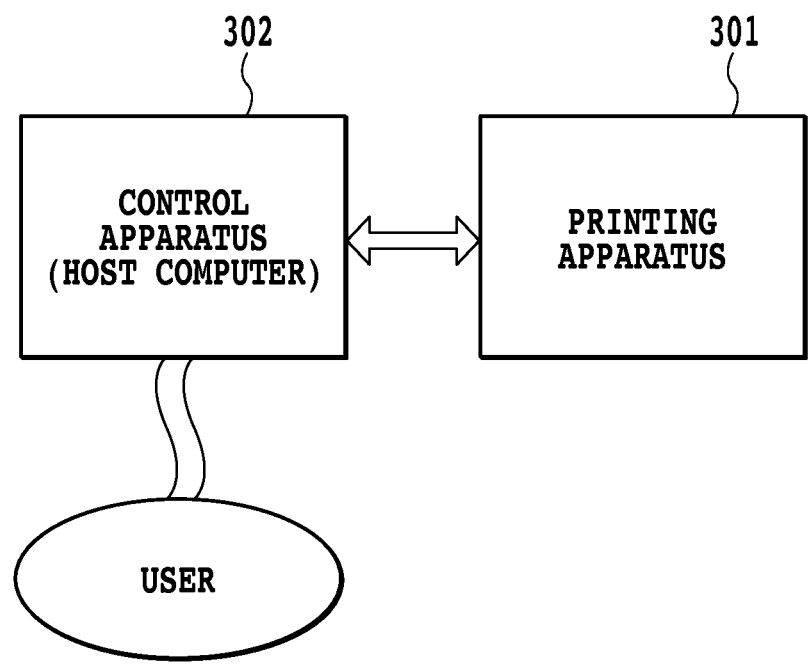
FIG. 3 is a block diagram illustrating a printing system according to an embodiment of the invention configured to include an inkjet printing apparatus and a host computer.

FIG. 3 is a block diagram illustrating a printing system according to an embodiment of the present invention configured to include an inkjet printing apparatus 301 and a host computer (hereinafter referred to as a host apparatus) 302. The printing apparatus 301 and the host apparatus 302 are connected via a known communication means can communicate to each other. A user can access the host apparatus 302 to output a desired image through the printing apparatus 301. During this, the host apparatus 302 subjects image data to be printed to various processing as described later and sends the resultant print data to the printing apparatus 301.

Figure 4:
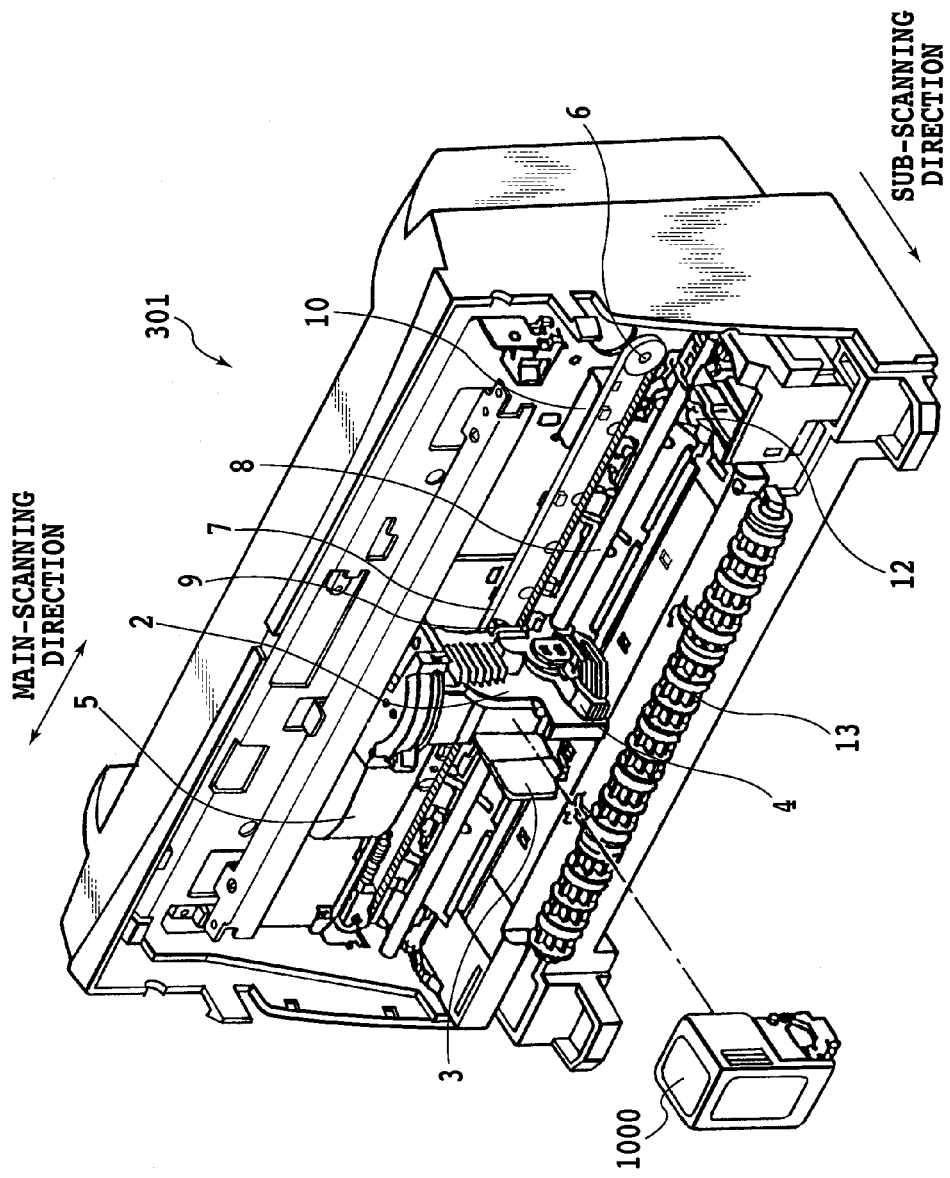
FIG. 4 is a perspective view illustrating the outline of the mechanical configuration of the inkjet printing apparatus shown in FIG. 3.

FIG. 4 is a perspective view illustrating the outline of the mechanical configuration of the inkjet printing apparatus 301 shown in FIG. 3 where the front cover of the apparatus is removed to expose the interior of the apparatus. In FIG. 4, the reference numeral 1000 denotes a replaceable head cartridge, the reference numeral 2 denotes a carriage unit that retains the head cartridge 1000 in a detachable manner, and the reference numeral 3 denotes a holder for fixing the head cartridge 1000 to the carriage unit 2, respectively. The head cartridge 1000 is integrated with a print head in which ejection openings for ejecting ink are provided. By attaching the head cartridge 1000 to the carriage unit 2 to subsequently operate a cartridge fixing lever 4, the holder 3 can be operated to fix the head cartridge 1000 such that the head cartridge 1000 is abutted to the carriage unit 2. This abutting provides the positioning of the head cartridge 1000 and the contact between a predetermined electric contact for signal transmission provided in the carriage unit 2 and an electric contact of the head cartridge 1000-side.

The reference numeral 5 denotes a flexible cable for the transmission of an electric signal between the apparatus controlling section and the carriage unit 2, the reference numeral 6 denotes a carriage motor constituting a driving source for reciprocating the carriage unit 2 in the main scanning direction, and the reference numeral 7 denotes a carriage belt for transmitting the driving force to the carriage unit 2, respectively. The reference numeral 8 denotes a guide shaft that extends in the main scanning direction to support the carriage unit 2 and that guides the move of the carriage unit 2. The reference numeral 9 denotes a transmission-type photo coupler attached to the carriage unit 2 and the reference numeral 10 denotes a light-blocking plate provided in the vicinity of the carriage home position, respectively. By this configuration, when the carriage unit 2 reaches the home position, the light-blocking plate 10 can block the light axis of the photo coupler 9 to thereby detect that the carriage unit 2 is at the home position. The reference numeral 12 denotes a home position unit that includes a recovery mechanism having a cap member that caps the print head in the head cartridge 1000, a suction mechanism that sucks the interior of the ejection opening via the cap member, and a member that wipes the surface of the ejection opening surface of the print head.

The reference numeral 13 denotes a discharge roller for discharging print media. The discharge roller 13 cooperates with a spur-like roller (not shown) to sandwich a print medium therebetween to thereby discharge this to the outside of the printing apparatus 301. A line feed unit (not shown) is also used to convey a print medium in the sub scanning direction in a predetermined amount. A path along which a print medium is conveyed has thereon a paper end sensor (PE sensor) (not shown) that can detect a tip end or a rear end of a print medium.

Figure 5:
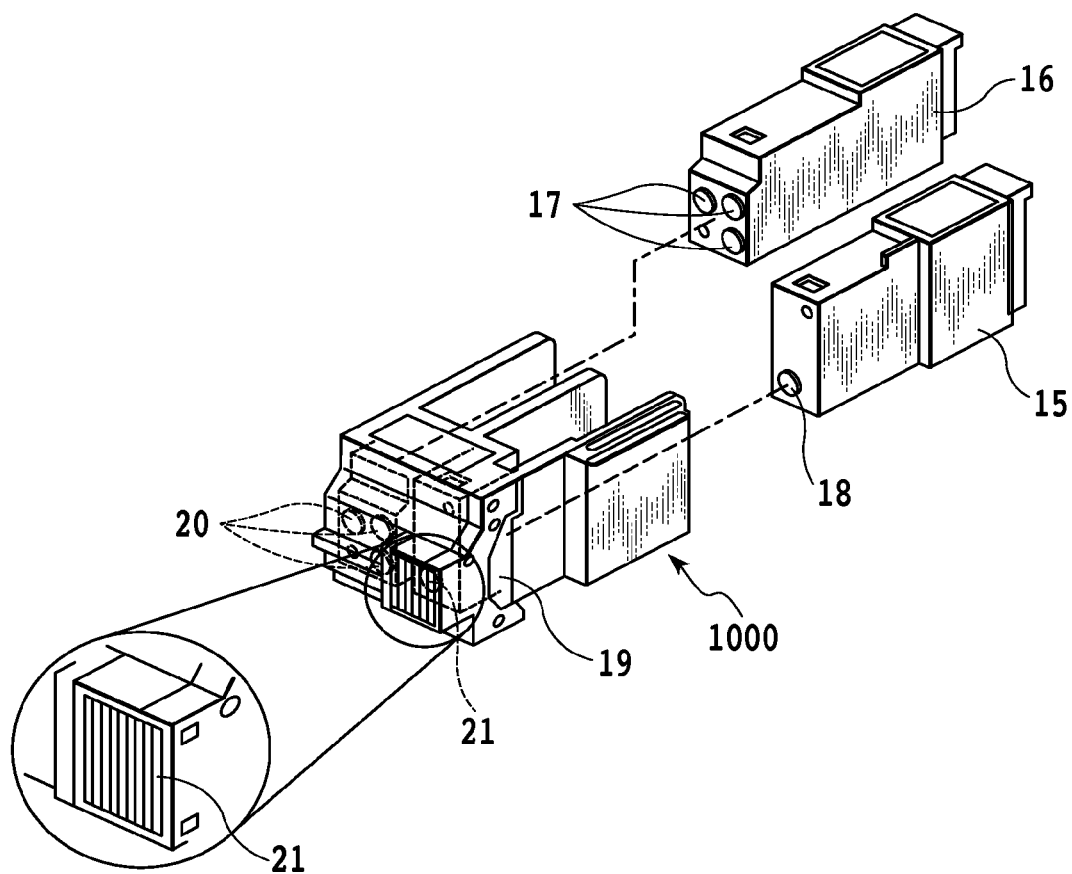
FIG. 5 is an exploded perspective view illustrating the details of a head cartridge shown in FIG. 4.

FIG. 5 is an exploded perspective view for explaining the details of the head cartridge 1000. In FIG. 5, the reference numeral 15 denotes a replaceable ink tank or storing black (Bk) ink and gray (GY) ink, the reference numeral 16 denotes a replaceable ink tank for inks of the respective color materials of storing cyan (C), magenta (M), and yellow (Y) respectively. The reference numeral 17 denotes an ink supply port of the ink tank 16 that is coupled to the head cartridge 1000 to supply ink. The reference numeral 18 similarly denotes an ink supply port of the ink tank 15. The ink supply ports 17 and 18 are configured to be coupled to a supply pipe 20 to supply ink to the print head 21. The reference numeral 19 denotes an electric contact that is configured to be connected to the flexible cable 5 to transmit a signal based on the print data to the print head 21.

In FIG. 5, eight lines shown at the front face of the print head 21 represent nozzle columns each of which consists of nozzles for ejecting inks of different colors and different droplet sizes. In particular, the nozzles eject black ink droplets (large: Bk), large cyan ink droplets (C), small cyan ink droplets (c), large magenta ink droplets (M), small magenta ink droplets (m), yellow ink droplets (Y), large gray ink droplets (GY), and small gray ink droplets (gy). In this embodiment, a large ink droplet is about 5 pl and a small ink droplet is about 2 pl.

Figure 6:
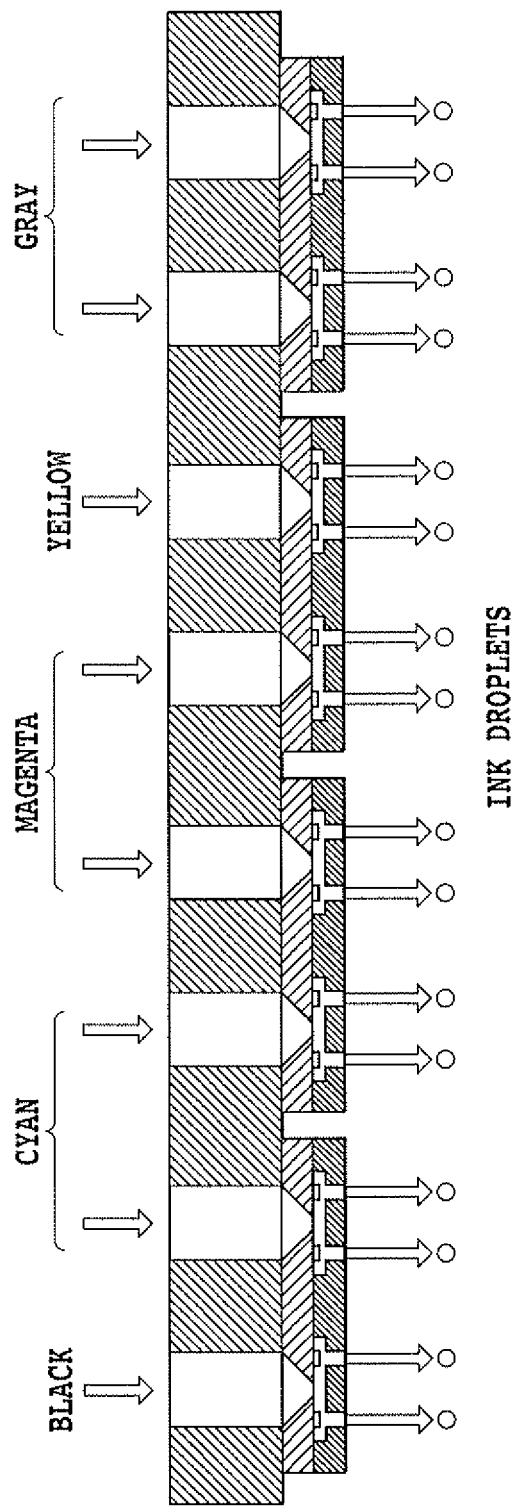
FIG. 6 is a cross sectional view schematically illustrating the outline of the configuration of the main part of a print head constituting the cartridge.

FIG. 6 is a cross-sectional view schematically illustrating the outline of the configuration of the main part of the print head 21. In FIG. 6, the reference numeral 4000 denotes a base plate that includes common liquid chambers 5101, 5103, 5105, 5107, 5109, 5111, 5113, and 5115 for accepting five types of inks for ejection. The respective common liquid chambers are coupled to supply paths 5102, 5104, 5106, 6108, 5110, 5112, 5114, and 5116 that are formed by subjecting the back face of a heater board formed by a semiconductor manufacturing process to an anisotropic etching. This allows the respective common liquid chambers to communicate with the ink path groups corresponding to the respective heater groups for ink ejection and can be separated and divided so as to prevent the mixing of inks of different colors.

The reference numeral 4001 denotes a heater board for black ink and large cyan ink droplets and the reference numeral 4002 denotes a heater board for small cyan ink droplets and large magenta ink droplets, respectively. The reference numeral 4003 denotes a heater board for small magenta ink droplets and yellow ink and the reference numeral 4004 denotes a heater board for large gray ink droplets and small gray ink droplets, respectively. Each heater board includes heaters 5004 and 5006 for ejection. The reference numerals 5001, 5002, 5003, and 5004 denote orifice plates including ink flow paths and nozzles that are generally formed by heat-resistant resin.

This configuration will be described by way of black ink for example. The black ink supplied from the liquid chamber 5102 is supplied to the ink flow paths in the vicinity of ejection heater groups 5004 and 5006. When a voltage pulse is applied to the respective heaters 5004 and 5006 in accordance with a print signal, the heaters rapidly generate heat to thereby cause film boiling. This film boiling causes a foaming energy to cause ink droplets to be ejected through the ejection openings 5005 and the ejection opening 5007 in the direction shown by the arrow. The ejected ink droplets land the print medium P to form dots corresponding to ink colors and ink droplet sizes. In this embodiment, one ink liquid chamber 5102 corresponds to two nozzle columns 5005 and 5007 among which the nozzle column 5005 at the left side of the drawing is called even number nozzles and the right nozzle (i.e., 5007) is called odd number nozzles.

Figure 7:
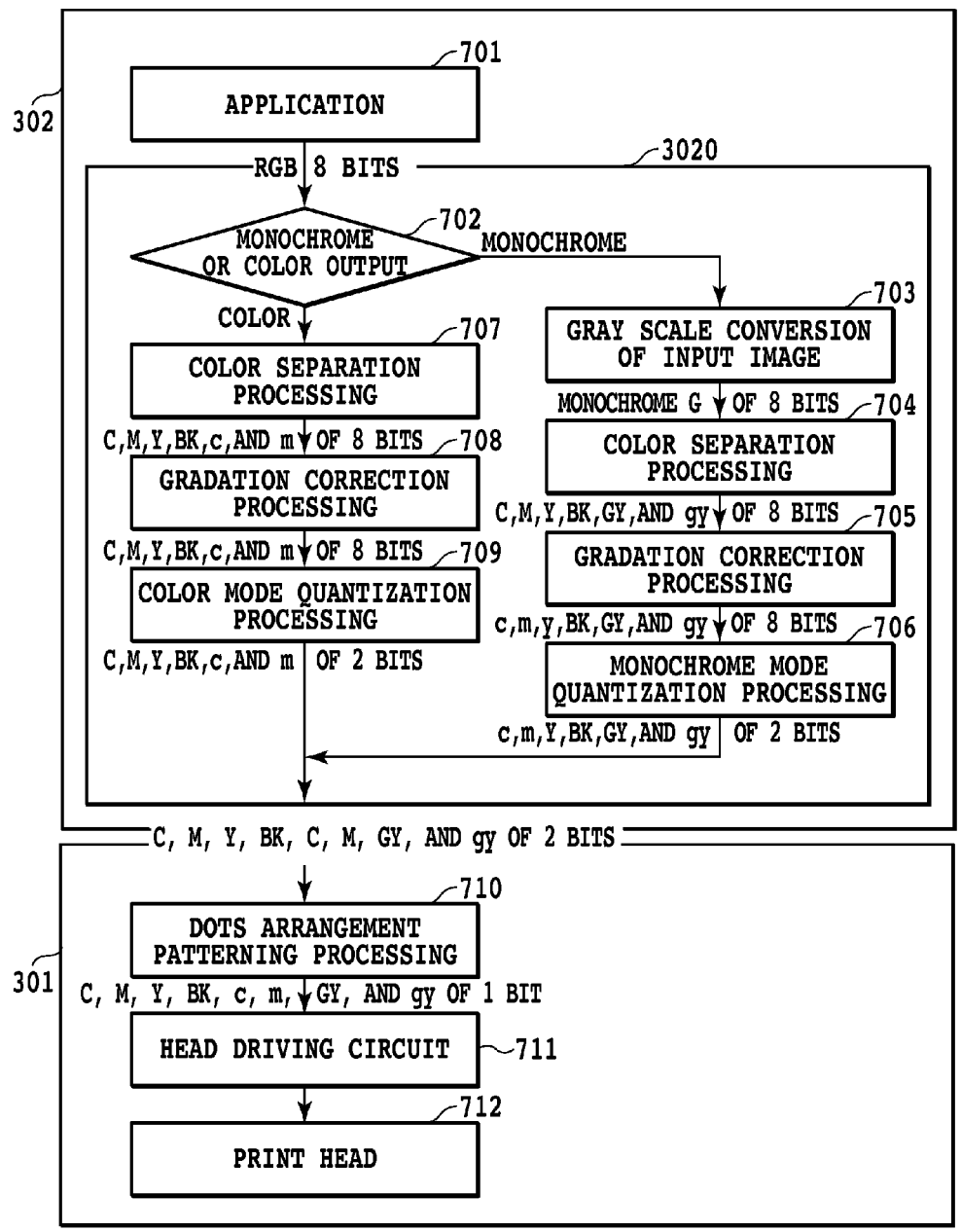
FIG. 7 is a block diagram illustrating the configuration of the image processing according to an embodiment of the present invention along with the series of steps thereof.

FIG. 7 is a block diagram illustrating the configuration for the image processing according to this embodiment along with the series of steps thereof. These image pressings are specifically carried out by an image processing configuration having CPU, ROM, and RAM and the like in the host apparatus 302 and the printing apparatus 301 shown in FIG. 3, respectively.

The image data created by an application 701 of the host apparatus 302 is represented by 8 bit brightness signals having respective 256 gradations of red (R), green (G), and blue (B). This image data is finally converted by a printer driver 3020 to quantized data that is used in the printing apparatus and the quantized data is sent to the printing apparatus 301. In the printer driver 3020, a resolution converting section (not shown) firstly performs resolution conversion (conversion to 600 ppi in this embodiment). Next, a determination section 702 determines (judges) whether the printing is a monochrome image output printing or a color image output printing. In this embodiment, the user selects between the monochrome image output printing and the color image output printing through the operation via the host 302. Other known methods also may be used including a method of determining whether image data prepared by an application is a monochrome image or a color image based on the image data.

When the monochrome image output is selected, the gray scale converting section 703 firstly subjects the image data created by the application to gray scale conversion. This gray scale conversion is a processing to convert R, G, and B data each of which is 8 bits and has 256 gradations to monochrome data of 8 bits and 256 gradations that has lightness information only. This conversion can use various known methods. In this embodiment, the following formula is used.

Monochrome gradation value $G=(W_R \times R + W_G \times G + W_B \times B)$·(number after the decimal point is rounded.)

In the formula, the weighting components are $W_R=0.299$, $W_G=0.587$, and $W_B=0.114$.

Next, a color separation processing section 704 converts the monochrome gradation data of 8 bits to 8 bit data corresponding to the types of the ink and the dot size used in the printing apparatus. Specifically, depending on the combination of types of the ink and the dot size, black dots (Bk dots), large gray dots (GY dots), small gray dots (gy dots), small cyan dots (c dots), small magenta dots (m dots), or yellow dots (Y dots) can be formed and thus 8 bit data of them is generated. Regarding these pieces of color separation data, the above stated respective dots correspond to combinations of the ink type and the ink droplet size which are described above with reference to FIG. 6. Thus, these pieces of color separation data correspond to the combinations. The color separation processing section 704 performs the processing by referring to a color separation table prepared in advance. The color separation table stores therein Bk, GY, gy, Y, c and m values to correspond to 17 monochrome gradation values G of 0, 16, 32, 48, 64, 80, 96, 112, 128, 144, 160, 176, 192, 208, 224, 240 and 255, respectively. In a specific processing, when the monochrome gradation value G is given, the color separation processing section references the color separation table to obtain respective values of Bk, GY, gy, Y, c and m of a coordinate point corresponding to that monochrome gradation value by interpolating respective Bk, GY, gy, Y, c and m values of grid points near the coordinate point.

The reason why the chromatic colors Y, c and m are outputted in spite of outputting the monochrome image in this embodiment will be described below. Generally, a print medium such as a print paper is white but is slightly colored. Thus, even when achromatic colors Bk, Gy and gy dots are formed, the resultant print image may have slightly chromatic due to the influence by the original color of the print medium. In order prevent this and to achieve a print image having an intended monochrome color, a small amount of inks of chromatic colors is used to cancel the colors owned by the print medium. However, an excessive use of chromatic ink may cause the color change. Thus, such chromatic color ink is used in an amount of a few percent of achromatic color ink.

Next, the gradation correction processing section 705 subjects the value outputted from the color separation processing section 704 to a conversion based on the gradation correction table. Specifically, the conversion is performed by referring to a gradation correction table that specifies converted values for the respective pieces of data of 256 gradations for the respective colors of Bk, GY, gy, c, and mY. In this embodiment, an input value (=output value from the color separation) in a range of 256 gradations of 0 to 255 is converted to provide an output value in a range of 0 to 4080. As a result, a more fine gradation correction can be achieved.

Figure 8:
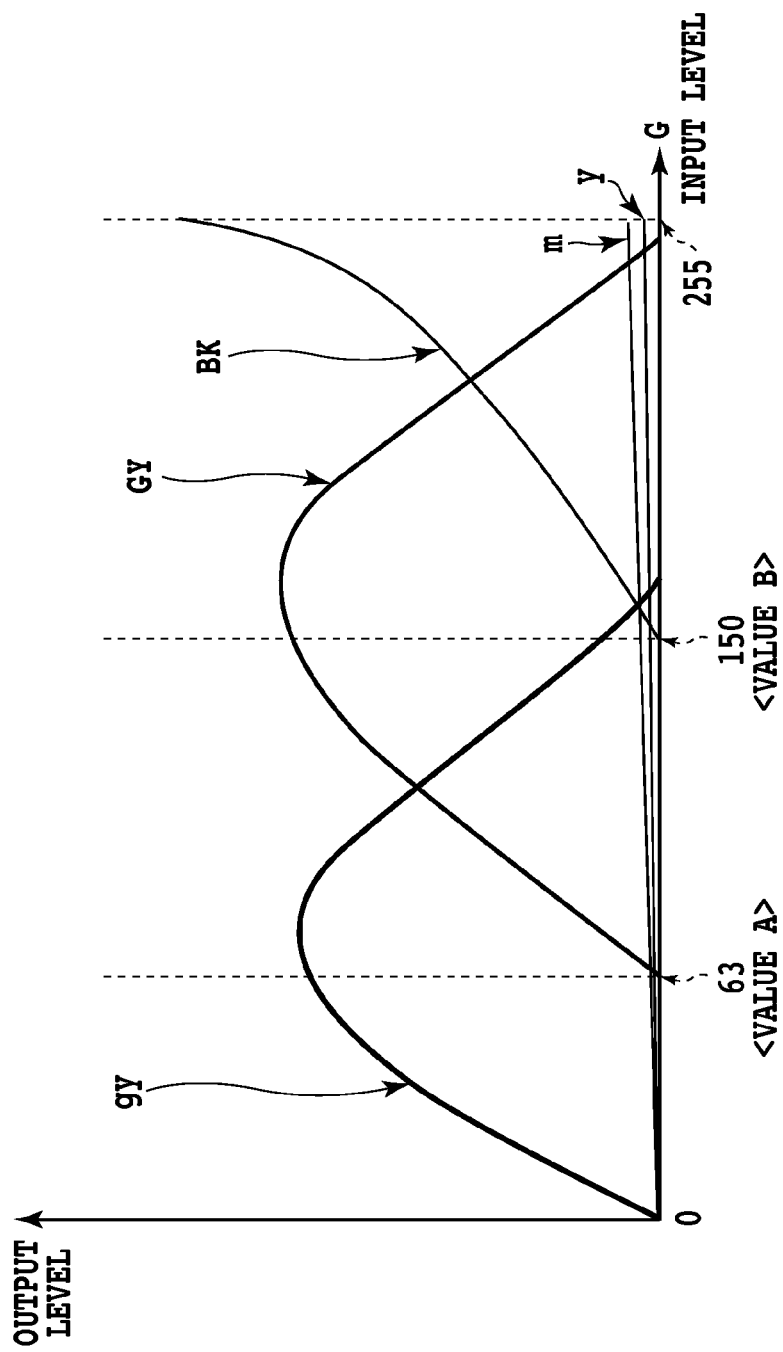
FIG. 8 is a diagram illustrating the relation between the monochrome gradation value G obtained from a gray scale converting section shown in FIG. 7 and the output data from the gradation correction processing section.

FIG. 8 is a diagram illustrating the relation between the monochrome gradation value G obtained from the gray scale converting section 703 and the data subjected to the above-described color separation processing and gradation correction processing, that is, the data outputted from the gradation correction processing section 705. FIG. 8 is similar to FIG. 2. The configuration of FIG. 8 is almost similar to that described in FIG. 2 but has a feature as described below.

As shown in FIG. 8, disposing of GY dots is started from the input value 63 (hereinafter value A). Disposing of Bk dots is started from the input value 150 (hereinafter value B). The m and Y dots are also disposed for the purpose of color adjustment. In this embodiment, since the print medium is slightly-bluish, no c component is used and only m and Y components are used.

With reference to FIG. 7 again, the value outputted from the gradation correction processing section 705 as described above is subjected by a monochrome mode quantization processing section 706 to a quantization processing in which data of each pixel is converted to 2 bit data having four values (level 0, level 1, level 2, and level 3).

Figure 9:
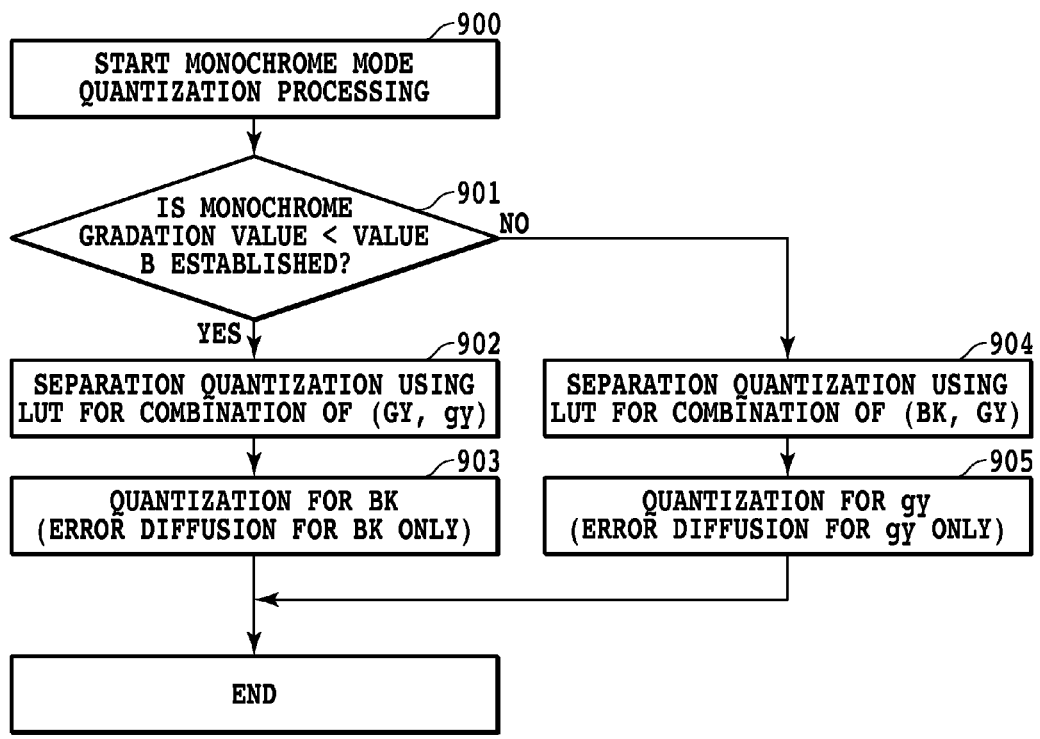
FIG. 9 is a flowchart illustrating the quantization processing according to the first embodiment of the present invention.

FIG. 9 is a flowchart illustrating the quantization processing according to the first embodiment of the present invention.

When Step 900 starts this processing, first at step 901, the monochrome mode quantization processing section determines, with regard to each pixel, whether the monochrome gradation value G calculated by the gray scale converting section 703 (FIG. 7) is lower than the value B or not. When the monochrome gradation value G is lower than the value B, the processing proceeds to step 902 where monochrome mode quantization processing section references the lookup table (LUT) by using only a combination of the data GY and gy among the data outputted from the gradation correction processing section 705 to obtain quantized values for performing separation error diffusion.

Figure 10:
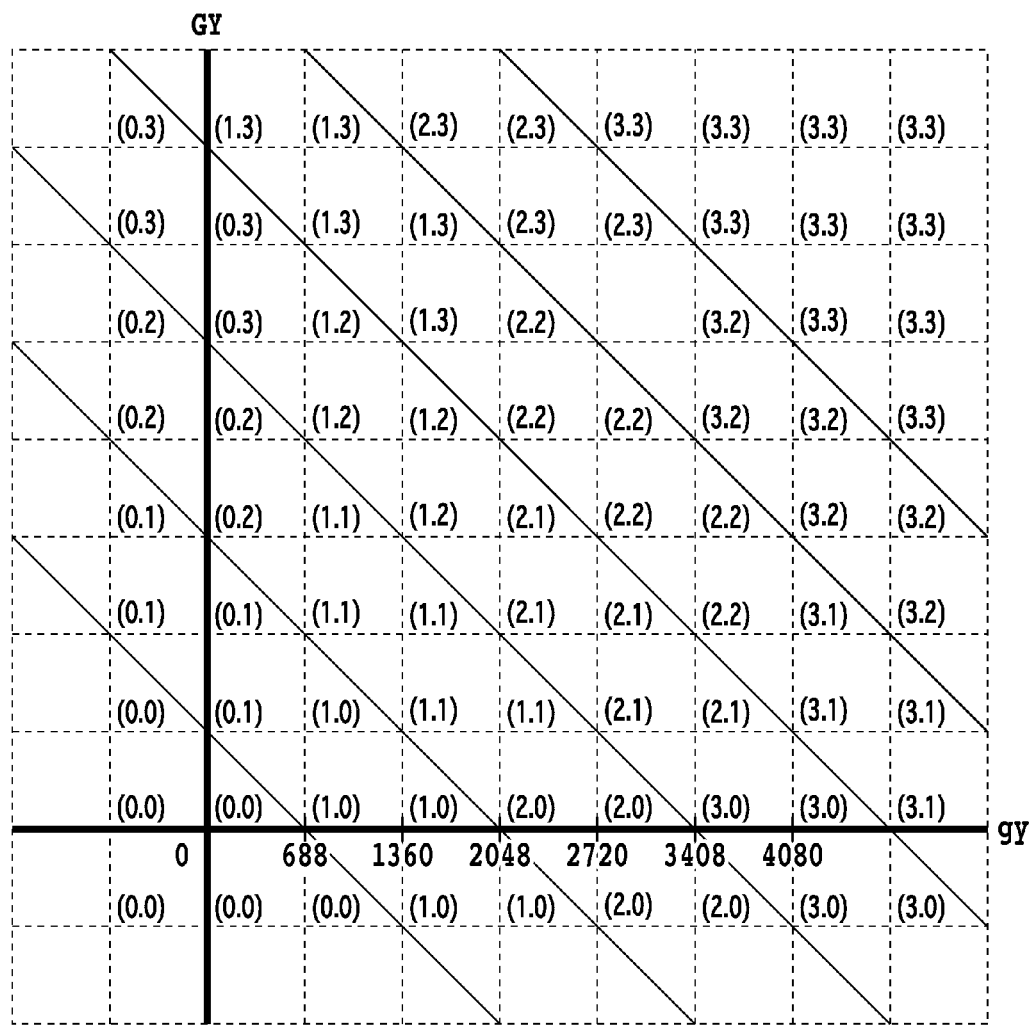
FIG. 10 is a diagram illustrating the LUT used in the separation error diffusion processing in the quantization.

FIG. 10 is a diagram illustrating the LUT used in the separation error diffusion processing. Specifically, FIG. 10 shows the contents of the LUT having GY and gy as an input in which the horizontal axis shows gy input values and the vertical axis shows GY input values. Further, values on grid points show quantized values of gy and GY, respectively.

Figure 11:
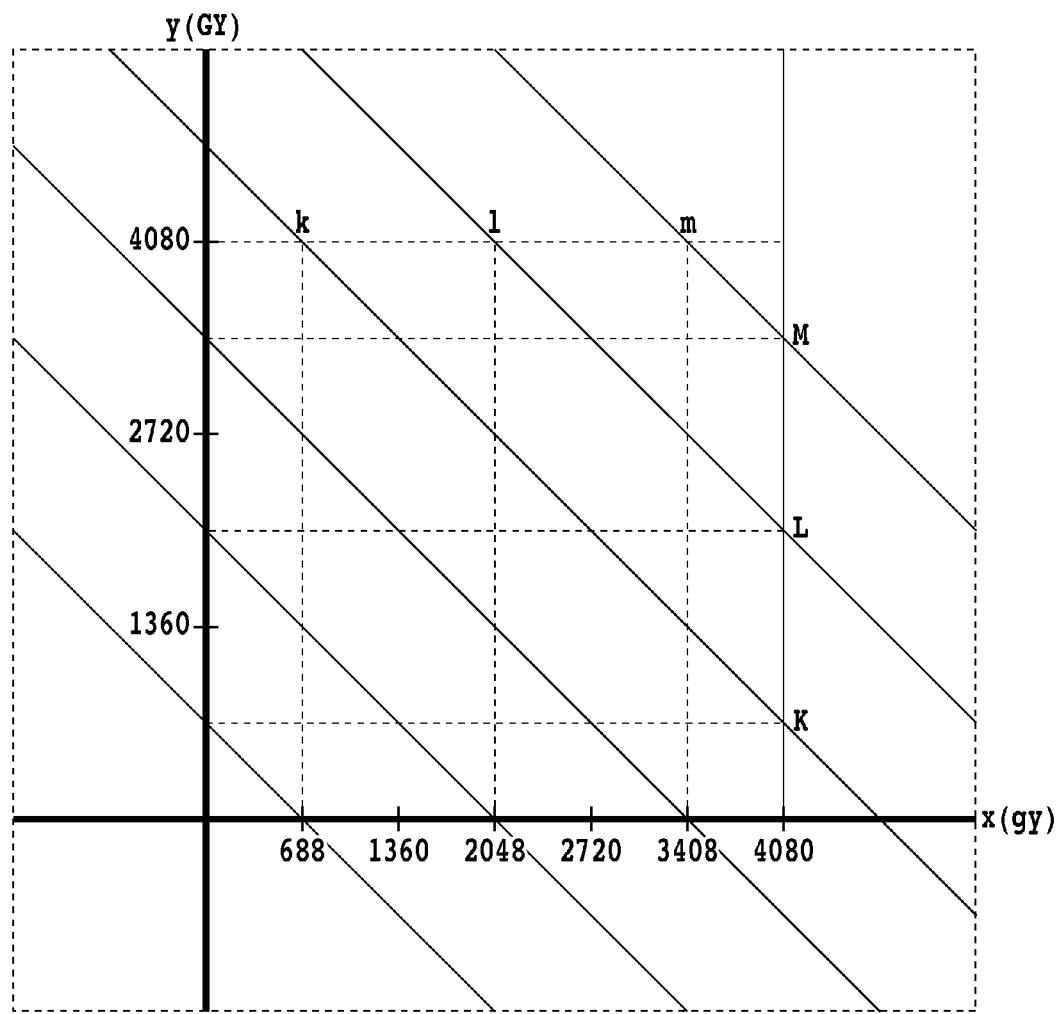
FIG. 11 is a diagram illustrating a density region in the LUT.

As shown in FIG. 10, since the LUT is used for four-valued quantization for both of GY and gy, quantization representative values and quantization threshold values are set as shown below. The quantization representative values of the levels 0, 1, 2 and 3 are 0, 1360, 2720 and 4080, respectively. The quantization threshold values between the levels 0 and 1, between the level 1 and 2, and between the level 2 and 3 are 688, 2048, and 3408, respectively. As shown in FIG. 11 in detail, points of the above-described threshold values "688", "2048", and "3908" are taken on the x axis (gy) and the y axis (GY), respectively. Then, the respective lines obtained by connecting points of the same threshold values on the x, y axes (three lines of a line connecting respective points of "688", a line connecting respective points of "2048" and a line connecting respective points of "3048"), and the respective lines obtained by connecting points of the same threshold values between points "K", "L", "M" taking the same value as the threshold value for GY on the line of x(gy)=4080 and points "k", "l", "m" taking the same value as the threshold value for gy on the line of y(GY)=4080 (three lines of a line connecting respective points of "K" and "k", a line connecting respective points of "L" and "l" and a line connecting respective points of "M" and "m"), can be used to provide seven divided density regions. Then, the density regions defined in the manner as described above are adjusted so that sums of the gy and GY quantized values made equal to each other in each of the density regions as shown in FIG. 10 by the method described in Japanese Patent Laid-Open No. 2003-224730.

The quantization section 706 uses the above described table to perform the quantization by the separation error diffusion of the combination of the multi-valued data gy and GY. For example, when the input level G shown in FIG. 8 is 80, the gradation correction processing section 705 outputs the combination of the multi-valued data gy and GY corresponding to the level G=80 and this multi-valued data combination is inputted to the quantization section 706. The quantization section 706 uses multi-valued data obtained by adding to the inputted data an error distributed as described later to reference the LUT shown in FIG. 10 and obtains the combination of four-valued quantized data (gy, GY).

In the error diffusion method using the table, an error distribution processing is performed depending on the resultant quantized data combination (gy, GY). Specifically, as described in Japanese Patent Laid-Open No. 2003-224730, the four-valued quantized data gy and GY are used to reference, for respective colors (plane; gy, Gy), the error center value table. The respective center values of the planes obtained by referencing the table are added to the multi-valued data gy, and GY inputted to the quantization section 706, respectively and thus the errors for the respective planes (gy, Gy)) are generated. Finally, with regard to each plane, the error is added to the input multi-valued data for a next object pixel for diffusing errors.

By performing quantization using the table as described above, even when only two pieces of data (gy, Gy) are used for referencing the table, firstly, an arrangement of dark dots (GY) and light dots (gy) in a region in which dark dots are sparsely disposed can be made to satisfy the perceived density. Thus, a situation can be avoided where the region in which dark dots are sparsely disposed has an insufficient density that can be compensated by increasing the number of light dots. Consequently, the granularity due to dark dots can be reduced. Secondly, since quantized values of dark and light dots are associated with one another correspondingly to the density region as described above, dark and light dots are disposed so as to be separated from one another due to the error diffusion characteristic. As a result, a probability can be reduced at which dark and light dots are arranged to be superposed or to be adjacent to one another and thus the granularity due to agglomerated dark and light dots also can be reduced.

When the quantization of the combination of gy and GY is completed as described above, at step 903 the monochrome quantization processing section subjects each of Bk, m, and y to quantization individually based on the error diffusion. This quantization can be performed by a known error diffusion method and thus will not be further described.

As apparent from the above description, even when an object pixel has the monochrome gradation value G outputted from the gray scale converting section 703 that is lower than the value B and has the multi-valued data Bk outputted from the gradation correction processing section 705 that is 0 (FIG. 8), distributed errors through the error diffusion of the previously-processed pixels may be accumulated for the object pixel and thus dots may be consequently formed on the object pixel. Specifically, as shown in FIG. 9, distributed errors may be accumulated when the previously-processed pixels are subjected to the quantization of Bk individually at step 903 and when the multi-valued data of Bk plane is quantized as described above in the separation quantization at step 904. For this reason, at steps 903 and 905 the quantization of the individual colors is performed.

When at step 901 the monochrome quantization processing section determines that the monochrome gradation value G is equal to or higher than the value B, the processing proceeds to Step 904. Here, the LUT of the combination of Bk and Gy is used to perform the same quantization as that for the combination of gy and GY as described above to thereby obtain the four-valued data. At step 905 the monochrome quantization processing section subjects each of gy (and m and Y) to the quantization individually by the error diffusion method as in Step 903.

In the above quantization of Step 902 and 904, Bk data is not used for a region smaller than the value B as shown in FIG. 8. Thus, it is assumed that the Bk data has little influence on the pixels of the region, and in order to prioritize the optimization of the granularity at the start of the input of the GY data, the separation quantization is performed by using the LUT of the combination of GY and y as an input. On the other hand, Bk data is used for a region equal to or greater than the value B. Thus, the region is subjected to the quantization using the LUT of only the combination of Bk and GY as an input. The reason why the combination of Gy with Bk is used rather than the combination of gy with Bk in this case is that superposition of Bk and GY has a higher optical density than that of superposition of Bk and gy because GY causes higher optical density than gy, and thus is visually recognized more easily. Specifically, the optimization of the combination of GY and Bk is more effective to reduce the granularity.

As described above, only two types of ink data for referencing the table can be used. Thus, the table size can be suppressed from increasing.

Figure 1:
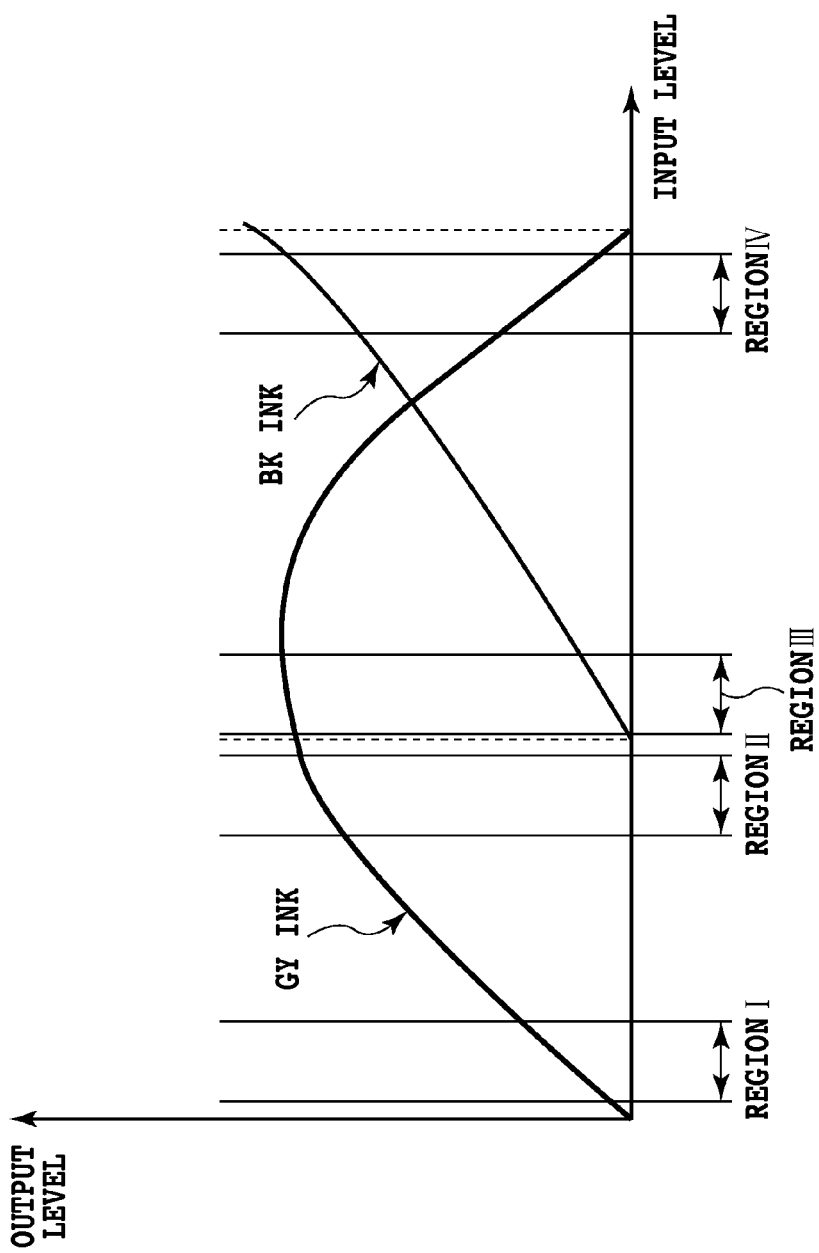
FIG. 1 is a diagram illustrating how to use K ink and GY ink when an achromatic color is printed.
Figure 2:
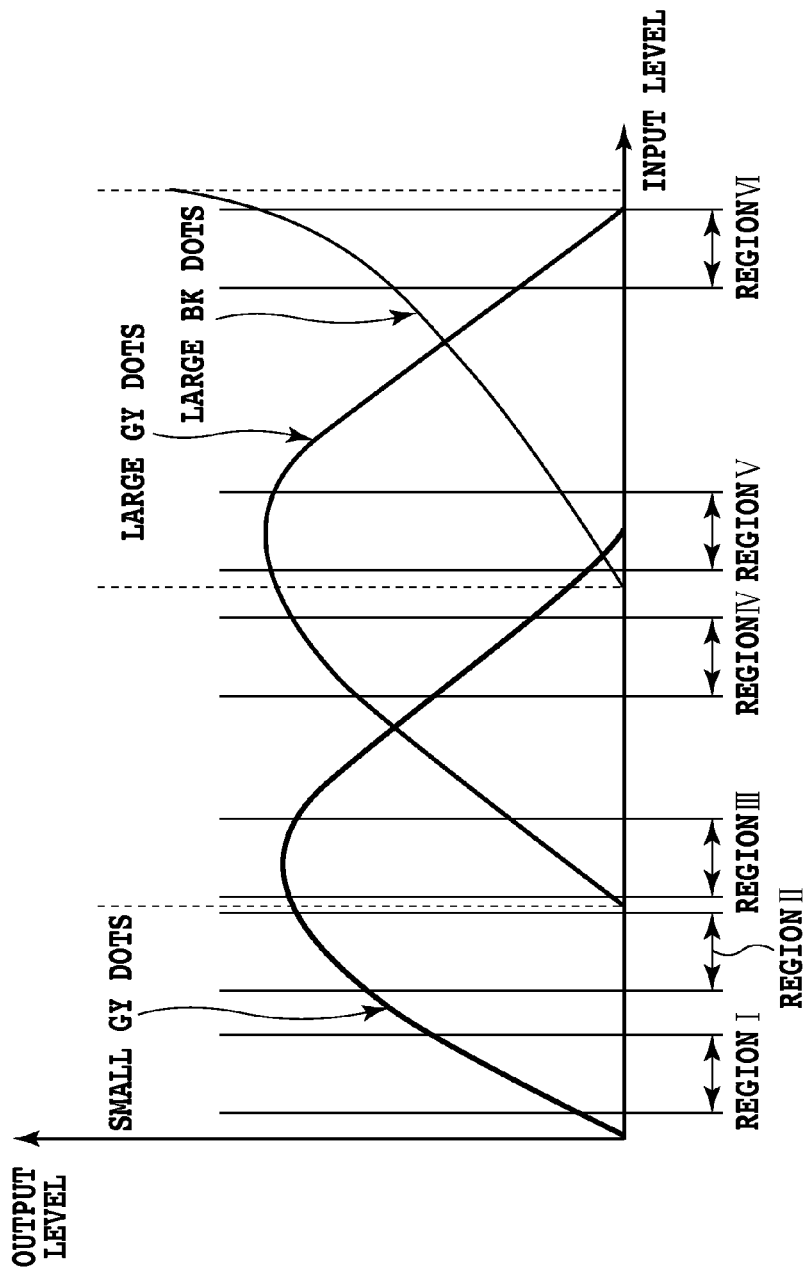
FIG. 2 is a diagram illustrating how to use three types of dots for printing an achromatic color of small dots by K ink, large dots by black ink of a low concentration, and small dots by black ink of a low concentration.

This embodiment relates to the example as shown in FIG. 8 where the three types of dots of gy, GY and Bk are used. Although the description regarding FIG. 2 showed an example where many types of inks are used and thus the granularity can be reduce, the quantization of this embodiment can further reduce the granularity in this case also. Specifically, the quantization of this embodiment can effectively reduce the generation of granularity even when a small number of types of inks are used. Thus, the number of types of pieces of ink data referencing the table can be at most 2, thus suppressing an increase in the table size.

With reference to FIG. 7 again, when the determination section 702 determines that the printing is the color output, the processing by the color separation processing section 707, the gradation correction processing section 708, and the color quantization processing section 709 are performed, respectively. These processing are the same as the known ones and thus will not be described further.

Figure 12:
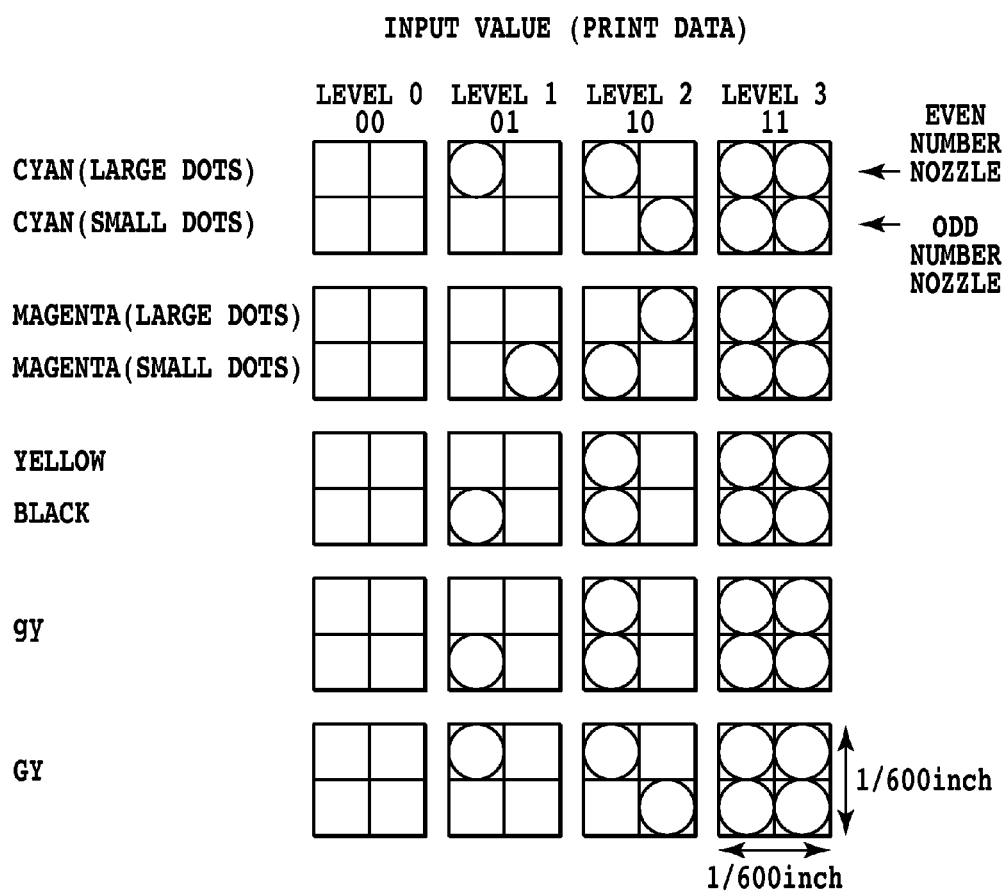
FIG. 12 is a diagram showing a dot pattern generated based on the quantized data obtained by the quantization processing.

FIG. 12 shows dot patterns generated by a dot arrangement patterning processing section 710 (FIG. 7) based on the quantized data obtained by the monochrome mode quantization processing section 706 (FIG. 7). The data of level 0 to 3 of the respective colors obtained through the quantization is data for arranging zero to four dots in one pixel having a resolution of 600 dpi. Specifically, the densities of the four levels are represented for the respective colors by printing or nor printing dots in each of 2 areas×2 areas constituting a region of one pixel. In FIG. 12, an area shown by a circle represents an area in which a dot is printed and an area shown by no circle represents an area in which a dot is not printed. As can be seen from FIG. 12, dots are not disposed in all areas when the input level is 0 but one dot is disposed when the input level is 1, two dots are disposed when the input level is 2, and four dots are disposed when the input level is 3. Thus, the higher the level is, the more dots are disposed (or printed).

The print data that is finally binarized (disposed as dot) as described above is transferred to a print head driving circuit 711 shown in FIG. 7. Based on this print data, ink is ejected from the print head. During the printing, in the 2×2 area of the dots arrangement pattern, even number nozzles perform the printing of the upper areas while odd number nozzles perform the printing of the lower areas. Through the series of processing as described above, the 600 dpi image data of 256 gradations is printed with two gradations and a resolution of 1200 dpi.

Although the above-described example has described an example where three types of dots having different optical densities are used to perform the monochrome printing, the present invention is not limited to this configuration. For example, two types of dots of large and small dots for dots of black (Bk) ink also can be formed and the present invention also can be applied to a system using the total of four types of dots. Specifically, the value of the monochrome gradation value G at which the input of dots having a higher optical density s started is set as a predetermined value. Then, the monochrome gradation value G is compared with the predetermined value. Based on the comparison result, the separation quantization may be performed for the combination of dots having an input for the quantization processing and dots having the next high optical density.

Specifically, it is assumed in advance that the gradation value at which the input of large GY dots is started is the value A, the gradation value at which the input of small Bk dots is started is the value B, and the gradation value at which the input of large Bk dots is started is the value C. When the monochrome gradation value is smaller than the value B is established, then the separation quantization of GY and gy is performed. When the value B is equal to or smaller than the monochrome gradation value G, and the monochrome gradation value C is equal to or smaller than the value C is established, small Bk dots and GY are subjected to the separation quantization. Further, when the value C is equal to or smaller than the monochrome gradation value G is established, then large Bk dots and small Bk dots are subjected to the separation quantization. This also can be applied to five or more types of dots.

When this embodiment is generalized, quantized data is generated that is used to form and print three or more types of dots having the same hue and different optical densities (e.g., monochrome dots). In this case, based on the data showing one color component (e.g., monochrome gradation data), a plurality of pieces of multi-valued data respectively corresponding to three or more types of dots are generated. Then, when the plurality of pieces of multi-valued data are quantized to obtain quantized data having a reduced gradation value, the table storing therein quantized data calculated to be associated with the plurality of pieces of multi-valued data is referred to with regards to the plurality of pieces of multi-valued data to thereby obtain quantized data. During this, depending on the value of the color component data, the table to be referenced is selected based on the multi-valued data among the pieces of multi-valued data corresponding to three or more types of dots that correspond to two types of dots. Then, this table is referred to for the multi-valued data that corresponds to two types of dots, thereby obtaining the quantized data.

(Embodiment 2)

Figure 13:
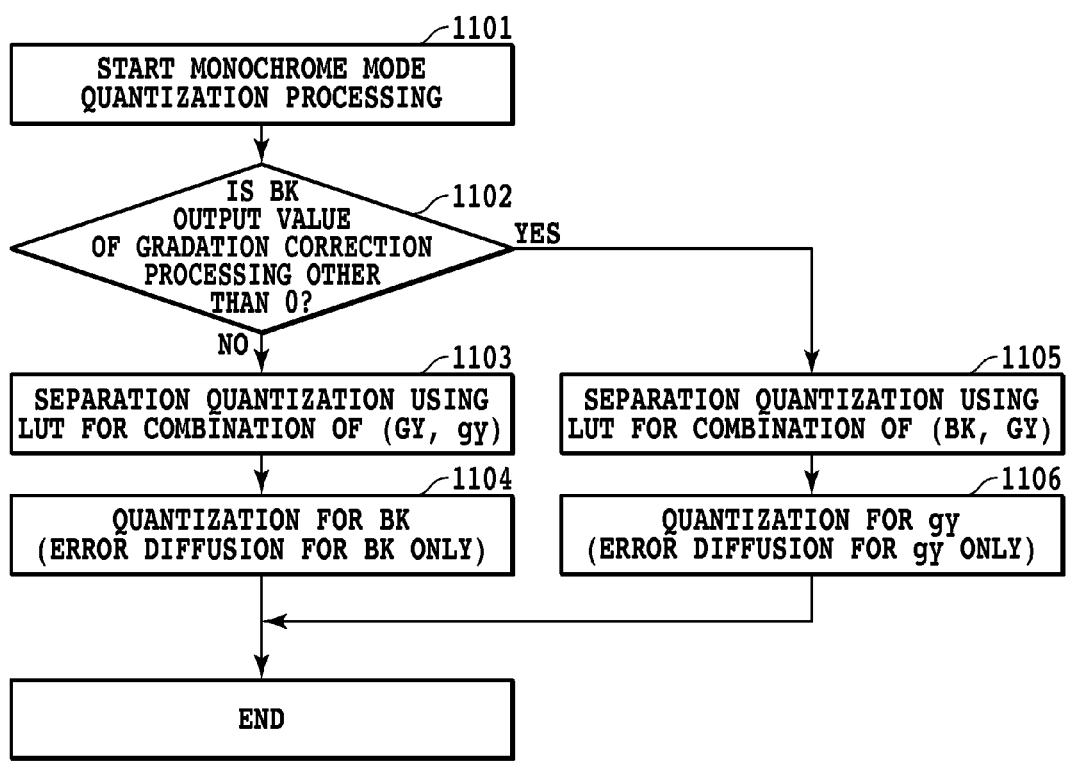
FIG. 13 is a flowchart illustrating the monochrome mode quantization processing according to the second embodiment of the present invention.

FIG. 13 is a flowchart illustrating the monochrome mode quantization processing according to a second embodiment of the present invention. The monochrome mode quantization processing of the second embodiment of the present invention is different from that of the first embodiment in that a combination of two pieces of data for referencing the LUT is changed depending on whether the Bk output from the gradation correction processing section 705 (FIG. 7) is 0 or not.

At step 1102 of FIG. 13, it is determined whether the Bk output value from the gradation correction processing section 705 is 0 or not. When it is determined that the Bk output value from the gradation correction processing section 705 is 0, the processing of step 1103 and subsequent steps to step 1103 are carried out. Specifically, this processing object pixel is judged as having substantially no contribution by Bk. At step 1103, the separation error diffusion is performed using the LOT of the combination of GY and gy as an input. Thereafter, at step 1104, each of Bk (and m and Y) is individually subjected to the quantization based on the error diffusion method.

When at step 1102, it is determined that the Bk output value is other than 0, then at step 1105, the pixel on the processing is assumed to have contribution by Bk and the separation error diffusion is performed using the LUT of the combination of Bk and GY as an input. Thereafter, Step 106 each of gy (and m and Y) individually subjected to the quantization based on the error diffusion method.

As described above, according to this embodiment, since Bk dots having the highest optical density are most influential to the granularity, any pixel involving a Bk output is assumed as causing a high probability at which Bk ink is ejected to the pixel. Then, data of the pixel is subjected to the quantization considering the superposition of Bk and other colors, thereby reducing the granularity. On the other hand, any pixel involving no Bk output is assumed as causing a low probability at which Bk dots are formed on the pixel. Thus, GY dots having the next-high optical density following Bk dots having the highest optical density are combined with gy and thus data of GY and gy is subjected to quantization. As a result, the granularity due to GY dot can be reduced favorably. It should be noted that even when the Bk output is 0, errors from other pixels may be accumulated to cause dots formed on that pixel. For this reason, even when the Bk output is 0, the Bk quantization processing of step 1104 is carried out.

As described above, in the system of using and printing three types of dots having different optical densities under the monochrome image output mode, whether the data value to be subjected to the quantization processing is 0 or not is determined. Based on the determination result, the combination of dots to be quantized is changed, so that any combination is composed of two types of dots at most. Thus, the granularity in the middle gradation region can be reduced without causing the LUT used for the quantization from having an increased size.

Figure 14:
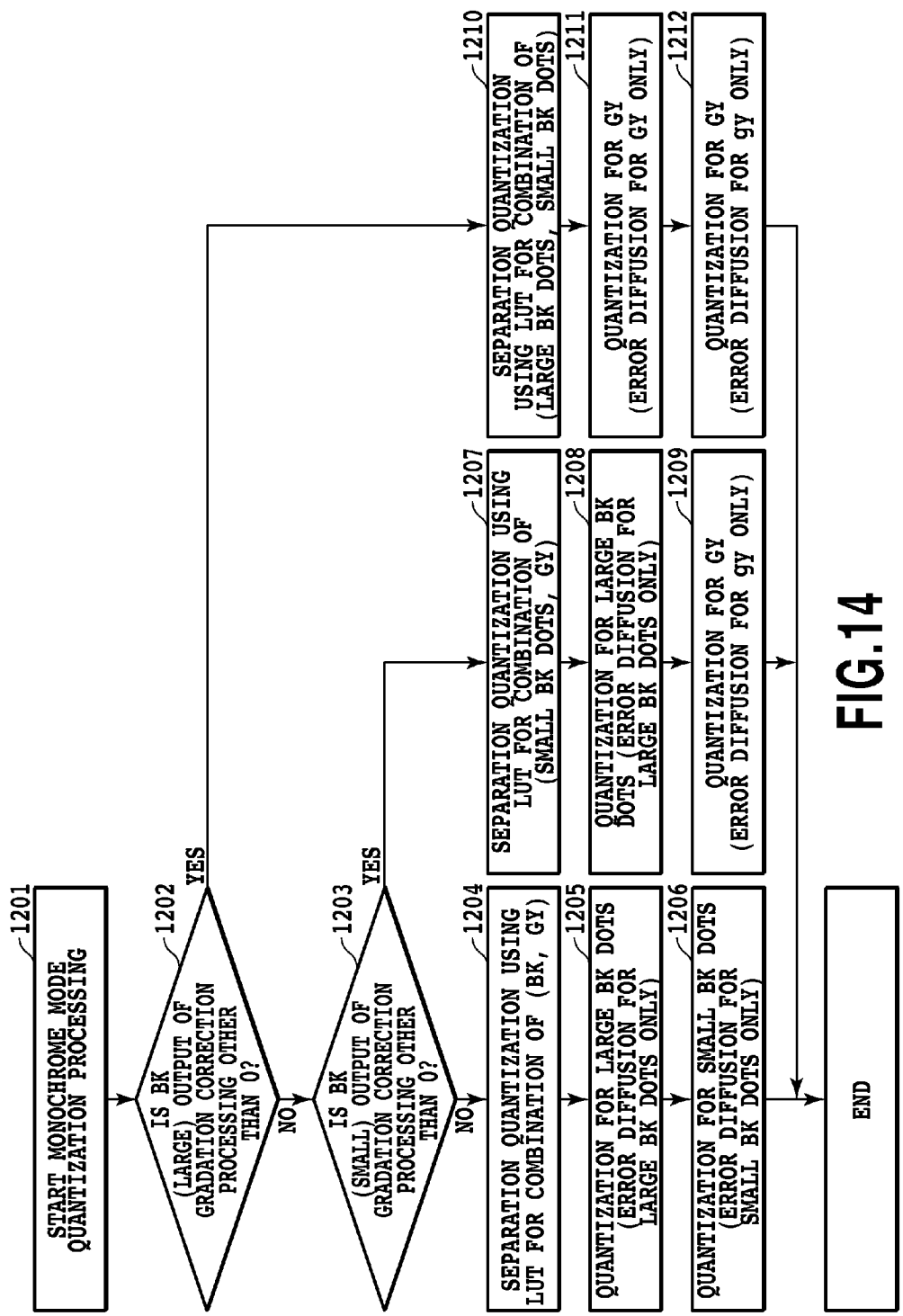
FIG. 14 is a flowchart illustrating the monochrome mode quantization processing according to a modification example of the second embodiment.

FIG. 14 is a flowchart illustrating the monochrome mode quantization processing according to a modification example of the second embodiment. Although the above example has used three types of dots having different optical densities to perform the monochrome printing, the present invention is not limited to this example. The present invention also can be applied to a case where four or more types of dots having different optical densities are used for printing.

Specifically, a plurality of types of dots (ink) are subjected to determination as to whether the data value to be quantized is 0 or not in a descending order of the optical density. When the data value to be quantized is not 0, in order to reduce the granularity of the dots formed based on the data, the dot data is combined with another dot data having the next-high optical density and the LUT of this combination is used for performing the quantization. When the data value to be quantized is 0, whether dots having the next-high optical density have a data value of 0 or not is determined. Then, the same processing is repeated.

In the example shown in FIG. 14, an example of a system is shown in which dots of Bk ink also can be formed as the two types of dots of large dots and small dots and the total of four types of dots are used. As described above, the gradation correction processing output values are checked in the descending order of the optical densities of dots to determine which combination is subjected to quantization.

When this embodiment is generalized, quantized data is generated that is used to form and print three or more types of dots having the same hue and having different optical densities (e.g., monochrome and cyan dots). In this case, when a plurality of pieces of multi-valued data are standardized to obtain quantized data having a lower gradation value, the plurality of pieces of multi-valued data are used to reference the table storing therein quantized data calculated by associating a plurality of pieces of multi-valued data to one another, thereby obtaining quantized data. Then, depending on the value of the multi-valued data corresponding to the three or more types of dots, the multi-valued data corresponding to two types of dots among the multi-valued data corresponding to the three or more types of dots is used to select a table to be referenced.

(Embodiment 3)

The present invention also can be applied to a case where ink other than achromatic color ink is used, that is, a case where a plurality of chromatic dots having substantially the same hue and having different optical densities are used for printing.

For example, the present invention can be applied to an embodiment where, in addition to C (large dots), M (large dots), Y, Bk, c (small dots) and m (small dots), medium cyan dots (C') and medium magenta dots (M') are used to perform printing. Specifically, for cyan and magenta, three types of dots of large dots, medium dots, and small dots are used for printing.

In the configuration shown in FIG. 7, the color separation processing section 707 separates the RGB data to eight types of colors of C, M, Y, K, c, m, C' and M'. Then, the data of the respective colors is subjected to the gradation correction by the gradation correction processing section 708. Regarding the input to the color separation processing section 707, there may be 2563 different inputs because of each of R, G, and B has 256 gradations. Among them, attention is paid only on a cyan component for which a cyan component=255−R can be represented for example.

Figure 15:
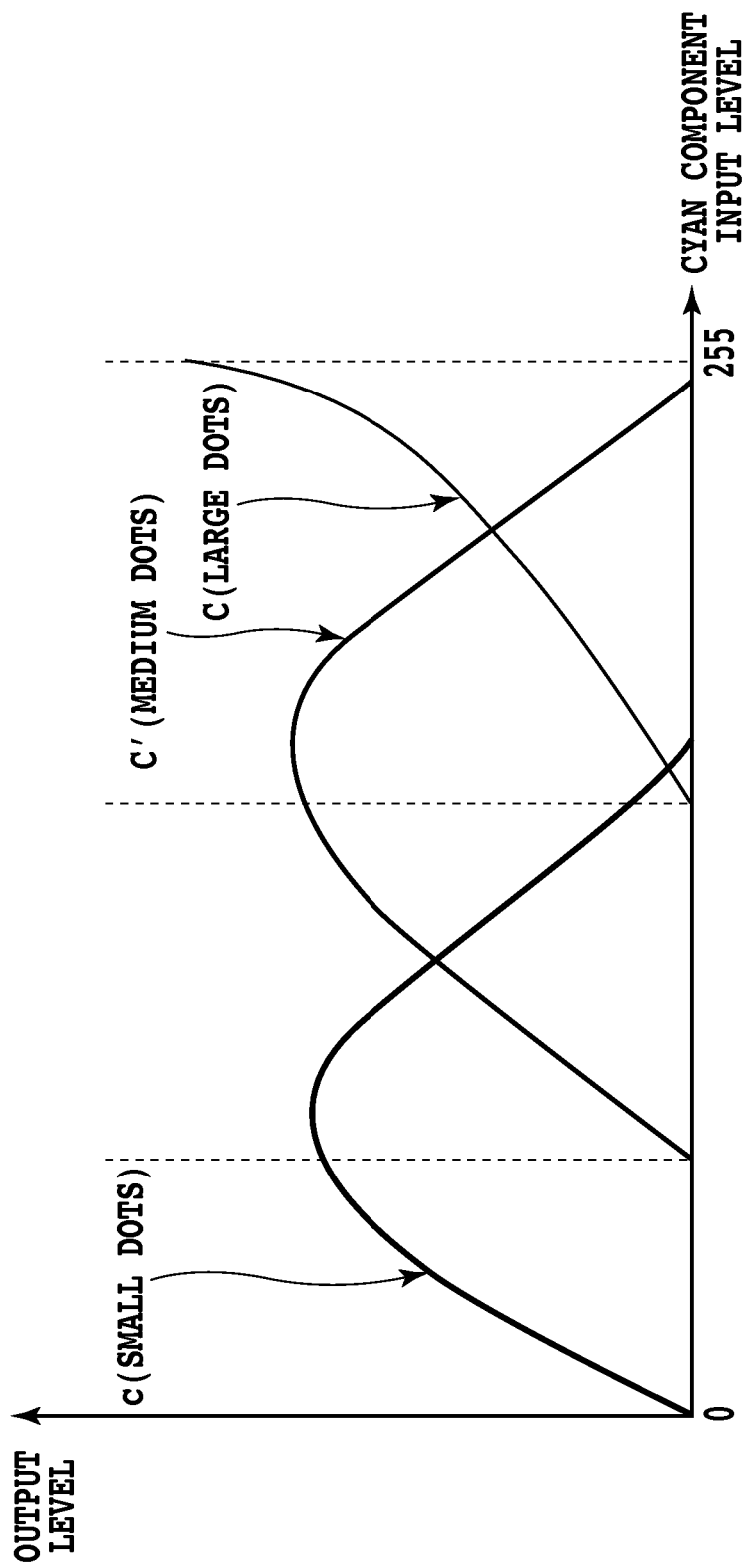
FIG. 15 is a diagram illustrating the relation between the input level of a cyan component and the output value from the gradation correction processing section according to the third embodiment of the present invention.

FIG. 15 is a diagram illustrating the relation between the input level of the cyan component and the output value from the gradation correction processing section 708. FIG. 15 is similar to FIG. 8. As shown in FIG. 15, how to use large cyan dots, medium cyan dots, and small cyan dots is determined depending on the input level of the cyan component. Then, the quantization processing section 709 determine whether the large cyan dots are 0 or not to thereby determine whether a combination of large and medium dots are subjected to quantization or a combination of medium dots and small dots is subjected to quantization. The same applies to magenta.

(Other Embodiments)

Although the above-described embodiments have described an example where the quantization processing according to the present invention is carried out by a printer driver of a host apparatus, this quantization processing also may be performed in a printing apparatus. In any case, the apparatus for performing the quantization processing according to the present invention constitutes an image processing apparatus.

Further Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-038523, filed Feb. 20, 2009, which is hereby incorporated by reference herein in its entirety.

What is claimed is:

1. An image processing apparatus that generates quantized data used for forming three or more types of dots having same hue which are different from one another in optical densities, said apparatus comprising:
   a generation unit configured to generate a plurality of multi-valued data for forming the three or more types of dots, based on data representing one color component; and
   a quantization unit configured to subject two multi-valued data corresponding to the two types of dots which are determined depending on a value of the color component data among the plurality of multi-valued data, to quantization with use of a table for generating quantized data, and to subject remaining multi-valued data other than the two multi-valued data to quantization without use of the table for generating quantized data,
   wherein the table is configured so that the two multi-valued data and quantized data corresponding to said two multi-valued data are associated with one another.

2. An image processing apparatus that generates quantized data used for forming three or more types of dots having same hue which are different from one another in optical densities, said apparatus comprising:

a generation unit configured to generate a plurality of multi-valued data for forming the three or more types of dots, based on data representing one color component; and a quantization unit configured to subject two multi-valued data corresponding to the two types of dots which are determined depending on a value of the color component data among the plurality of multi-valued data, to quantization with the two multi-valued data being associated with one another, and to subject remaining multi-valued data other than the two multi-valued data to quantization individually.

3. The image processing apparatus as claimed in claim 1, wherein said quantization unit compares the value of the color component data with a predetermined value and uses the table according to the comparison result.

4. The image processing apparatus as claimed in claim 3, wherein said quantization unit uses the table referenced by using the multi-valued data corresponding to the two types of dots one of which has the highest optical density and another of which has the second highest optical density.

5. The image processing apparatus as claimed in claim 3, wherein the predetermined value corresponds to the value of the color component data at which generation of the multi-valued data corresponding to the dot having the highest optical density starts, in generation of the multi-valued data by said generation unit.

6. The image processing apparatus as claimed in claim 1, wherein said quantization unit uses the table according to a determination as to whether the multi-valued data corresponding to dot having the highest optical density is 0 or not.

7. The image processing apparatus as claimed in claim 1, wherein said quantization unit uses the table referenced by using the respective multi-valued data corresponding to two types of dots one of which has the highest optical density and another of which has the second highest optical density.

8. The image processing apparatus as claimed in claim 7, wherein said quantization unit judges whether the multi-valued data is 0 or not in a descending order of the optical density and determines the two types of dots based on the judgment.

9. An image processing method for generating quantized data used for forming three or more types of dots having same hue which are different from one another in optical densities, said method comprising:

a generation step of generating a plurality of multi-valued data for forming the three or more types of dots, based on data representing one color component; and a quantization step of subjecting two multi-valued data corresponding to the two types of dots which are determined depending on a value of the color component data among the plurality of multi-valued data, to quantization with use of a table for generating quantized data, and of subjecting remaining multi-valued data other than the two multi-valued data to quantization without use of the table for generating quantized data, wherein the table is configured so that the two multi-valued data and quantized data corresponding to said two multi-valued data are associated with one another.

10. An image processing method for generating quantized data used for forming three or more types of dots having same hue which are different from one another in optical densities, said method comprising:

a generation step of generating a plurality of multi-valued data for forming the three or more types of dots, based on data representing one color component; and a quantization step of subjecting two multi-valued data corresponding to the two types of dots which are determined depending on a value of the color component data among the plurality of multi-valued data, to quantization with the two multi-valued data being associated with one another, and of subjecting remaining multi-valued data other than the two multi-valued data to quantization individually.

* * * * *